United States Patent
Frost et al.

(10) Patent No.: US 11,381,359 B2
(45) Date of Patent: Jul. 5, 2022

(54) TRANSMISSION TIME FRAME STRUCTURE FOR TIME DIVISION DUPLEX COMMUNICATION

(71) Applicant: VODAFONE IP LICENSING LIMITED, Newbury (GB)

(72) Inventors: Timothy James Frost, London (GB); Razieh Razavi, London (GB)

(73) Assignee: VODAFONE IP LICENSING LIMITED

( * ) Notice: Subject to any disclaimer, the term of this patent is extended or adjusted under 35 U.S.C. 154(b) by 0 days.

(21) Appl. No.: 16/482,984

(22) PCT Filed: Feb. 2, 2018

(86) PCT No.: PCT/GB2018/050309
§ 371 (c)(1),
(2) Date: Aug. 1, 2019

(87) PCT Pub. No.: WO2018/142154
PCT Pub. Date: Aug. 9, 2018

(65) Prior Publication Data
US 2019/0349156 A1    Nov. 14, 2019

(30) Foreign Application Priority Data
Feb. 3, 2017    (GB) ...................... 1701815

(51) Int. Cl.
*H04L 5/00* (2006.01)
(52) U.S. Cl.
CPC .......... *H04L 5/0044* (2013.01); *H04L 5/0007* (2013.01); *H04L 5/0055* (2013.01)
(58) Field of Classification Search
CPC ... H04L 5/0044; H04L 5/0007; H04L 5/0055; H04L 25/03955; H04L 12/2879;
(Continued)

(56) References Cited

U.S. PATENT DOCUMENTS

| | | | |
|---|---|---|---|
| 8,363,575 B2 | 1/2013 | Jung et al. | |
| 2011/0243107 A1* | 10/2011 | Koivisto | H04W 72/1215 370/336 |

(Continued)

FOREIGN PATENT DOCUMENTS

| | | |
|---|---|---|
| WO | 2010057008 | 5/2010 |
| WO | 2017127179 | 7/2017 |

OTHER PUBLICATIONS

LG Electronics, "Discussion on flexible duplex operations in NR design", vol. RAN WG1, No. Lisbon, Portugal; Oct. 10, 2016-Oct. 14, 2016, Oct. 9, 2016 (Oct. 9, 2016), 3GPP Draft; R1-1610415, 3rd Generation Partnership Project (3GPP), Mobile Competence Centre ; 650, Route Des Lucioles ; F-06921 Sophia-Antipolis Cedex ; France Retrieved from the Internet: URL:http://www.3gpp.org/ftp/Meetings_3GPP_SYNC/RAN1/Docs/XP051150423 [retrieved on Oct. 9, 2016] Sections 1-3; figure 1.
(Continued)

*Primary Examiner* — Kibrom T Hailu
(74) *Attorney, Agent, or Firm* — Workman Nydegger (57) ABSTRACT

A structure of a transmission time frame for Time Division Duplex (TDD) two-way communication over a frequency bandwidth is provided. The transmission time frame is assigned for a first direction of communication and is temporally divided into a plurality of transmission symbols. A fraction of the frequency bandwidth for a selected transmission symbol from the plurality of transmission symbols is assigned to a second direction of communication, the second direction being opposite to the first direction.

14 Claims, 4 Drawing Sheets

(58) Field of Classification Search
CPC ............... H04W 48/12; H04W 72/042; H04W 72/0413; H04W 72/1268; H04W 72/1273; H04W 74/004; H04W 74/006; H04W 25/03955; H04W 12/287
See application file for complete search history.

(56) References Cited

U.S. PATENT DOCUMENTS

| | | | | |
|---|---|---|---|---|
| 2012/0263117 | A1* | 10/2012 | Love | H04L 5/003 370/329 |
| 2014/0348117 | A1* | 11/2014 | Zhang | H04L 9/0891 370/329 |
| 2015/0326378 | A1 | 11/2015 | Zhang et al. | |
| 2015/0333898 | A1 | 11/2015 | Ji et al. | |
| 2016/0353436 | A1 | 12/2016 | Au et al. | |
| 2017/0310435 | A1* | 10/2017 | Wei | H04L 5/0007 |
| 2018/0191526 | A1* | 7/2018 | Xu | H04L 25/0224 |
| 2018/0248662 | A1* | 8/2018 | Kim | H04L 5/0044 |
| 2018/0254794 | A1* | 9/2018 | Lee | H04J 11/0069 |

OTHER PUBLICATIONS

Samsung, "Discussion on TTI, subframe and signalling timing for NR", vol. RAN WG1, No. Nanjing, China; May 23, 2016-May 27, 2016, May 13, 2016 (May 13, 2016), 3GPP Draft; R1-164004 NR_FS, 3rd Generation Partnership Project (3GPP), Mobile Competence Centre ; 650, Route Des Lucioles ; F-06921 Sophia-Antipolis Cedex ; France Retrieved from the Internet: URL:http://www.3gpp.org/ftp/tsg_ran/WG1_RL1/TSGR1_85/Docs/ XP051090300 [retrieved on May 13, 2016] Sections 1-3; figure 2.
NTT Docomo et al, "Summary of [87-32]: UL L1/L2 control channel design for NR", vol. RAN WG1, No. Spokane, USA; Jan. 16, 2017-Jan. 20, 2017, Jan. 17, 2017 (Jan. 17, 2017), 3GPP Draft; R1-1700618, 3rd Generation Partnership Project (3GPP), Mobile Competence Centre ; 650, Route Des Lucioles ; F-06921 Sophia-Antipolis Cedex ; France Retrieved from the Internet: URL:http://www.3gpp.org/ftp/tsg_ran/WG1_RL1/TSGR1_AH/NR_AH_1701/ Docs/XP051222223 [retrieved on Jan. 17, 2017] The whole document.
International Search Report and Written Opinion for PCT/GB2018/050309 dated Apr. 4, 2018.
Examination Report for European Patent Application No. 18704066.2 dated Oct. 29, 2020.
NTT Docomo, Inc. et al., "5G Vision for 2020 and Beyond", 3GPP Draft; RWS-150051 5G Vision Docomo, $3^{rd}$ Generation Partnership Project (3GPP), Mobile Competence Centre; 650, Route des Lucioles; F-06921 Sophia-Antipolis Cedex; France, No. Phoenix, AZ, USA; Sep. 17, 2015-Sep. 18, 2015 Sep. 3, 2015, XP051043768, retrieved from the internet: URL: http://www.3gpp.org/ftp/workshop/2015-09-17_18_RAN_5G/Docs/ [retrieved on Sep. 3, 2015].

* cited by examiner

Figure 1

PRIOR ART

TRANSMISSION TIME FRAME STRUCTURE FOR TIME DIVISION DUPLEX COMMUNICATION

TECHNICAL FIELD OF THE INVENTION

The disclosure concerns a method of structuring a transmission time frame for Time Division Duplex (TDD) two-way communication and a corresponding TDD two-way communication device.

BACKGROUND TO THE INVENTION

The Third Generation Partnership Project (3GPP) has been developing specifications for Fifth Generation (5G) telecommunication standards, in particular including a new radio protocol stack. Providing low latency services is considered a highly desirable use of 5G technology. This new radio protocol stack is expected to operate largely on unpaired spectrum, which typically uses a Time Division Duplex (TDD) arrangement, in which the user device and base station can either transmit or receive at any given time, but not both.

A drawback of TDD operation is that, simultaneous transmission and reception is not possible, significant round trip delays are likely, since the time duration between a downlink assignment instance of the radio frequency bandwidth and an uplink assignment instance of the radio frequency bandwidth may be much longer than for Frequency Division Duplex (FDD) operation. This round trip delay may affect error control mechanisms using acknowledgment (ACK) and non-acknowledgment (NACK) messages, such as Automatic Repeat Request (ARQ) and Hybrid ARQ (HARQ). Services requiring low latency and using such error control mechanisms could therefore have difficulty operating on these systems.

One way to mitigate the latency problem is using self-contained frames. In this structure, a fast ACK/NACK message may be transmitted within the same sub-frame as the data to which it refers. This is feasible in small isolated cells, such as cells operating above 6 GHz frequency bands. However, it is impractical for use with frequency bands below 6 GHz, for which there is the high possibility that (in order to coexist with other operators), the uplink-downlink configurations may be restricted. This may prevent dynamic switching to allow transmission of ACK/NACK messages in response to data. In addition, regulators in some markets have indicated specific ratios of uplink-downlink configuration that must be used. This may further prevent such implementations. Restrictions on the uplink-downlink configuration may further mean restrictions on when HARQ ACK messages can be sent in response to data received on the TDD carrier for both 'standalone' and 'dual connectivity' deployment scenarios. For data transmitted on the TDD carrier requiring low latency, delays in transmitting ACK/NACK messages would be a problem.

Existing Fourth Generation (4G) telecommunication standards, such as those specifying a radio protocol stack for Long Term Evolution (LTE) systems, have already tried to address a similar problem, using a radio frame split into 10 sub-frames. As an example, Table 1 (below) is taken from 3GPP TR 36.211, "Evolved Universal Terrestrial Radio Access (E-UTRA); Physical channels and modulation" and demonstrates some selectable structures for transmission time frames (radio frames). These are temporally sub-divided into sub-frames. For each sub-frame in the transmission time frame, "D" denotes a downlink sub-frame reserved for downlink transmissions, "U" denotes an uplink sub-frame reserved for uplink transmissions and "S" denotes a special sub-frame.

TABLE 1

Uplink-downlink configurations

| Uplink-downlink config-uration | Downlink-to-Uplink Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Taking into account uplink-downlink configuration 2 (the best in terms of waiting time for switching between uplink and downlink), it can be seen that a delay of 2 to 3 ms will be experienced, depending on the sub-frame number before a ACK/NACK feedback message can be sent. This limited number of opportunities for switching from uplink to downlink or vice versa can cause a problem with sending fast feedback in the same TDD band; a wait for a two transmissions is required before the ACK/NACK message can be sent.

The use of a fixed switch point periodicity may further prevent any reduction in this delay by shortening the Transmission Time Interval (TTI). Some uplink reference signals, such as Sounding Reference Signals (SRS), are also desirably transmitted periodically for accurate channel estimation. This is intended for beamforming use in 5G systems and their transmission could be made significantly more difficult by existing structures. Hence, an improved time frame structure for TDD two-way communication, addressing these issues, would be of great value

SUMMARY OF THE INVENTION

Against this background, the present invention provides a method of structuring a transmission time frame for Time Division Duplex (TDD) two-way communication according to claim 1 and a TDD two-way communication device in line with claim 14.

Each radio (time) frame (or more specifically, a sub-frame of a larger time frame) of the TDD transmission is split into transmission symbols. Whilst the time frame (or sub-frame) is assigned for communication in a forward direction (for example, uplink), one of the transmission symbols (a selected transmission symbol) is used for communication in the opposite direction (in this example, downlink). This may enable, within a time frame configured for one (forward) direction, transmission in the reverse direction. Since only a fraction of a transmission symbol may be required for this purpose, it can be done at highly frequent intervals.

In particular, only a fraction of the frequency bandwidth allocated to the time frame may be used. This adds a further guard band that can protect transmissions on adjacent bandwidth from the reverse direction transmission and vice versa. Such division of the frequency bandwidth can be implemented using Orthogonal Frequency Division Multiplexing (OFDM) communication, for instance, by appropriate allocation of Resource Blocks. The frame structure is advantageously then used for communication.

The features of the present disclosure may allow both uplink and downlink transmissions in the same time frame (and sub-frame) for TDD cells, especially operating on frequency bands below 6 GHz. Moreover, they may enable fast acknowledgement information transmission (ACK/NACK) to reduce latency significantly.

A number of different configurations are proposed. In a first configuration, the portion of the transmission symbol bandwidth assigned to the reverse direction is an inner (more central) part of the bandwidth and outer portions of the bandwidth, adjacent the inner portion, are assigned as guard bands. In a second configuration, the portion of the transmission symbol bandwidth assigned to the reverse direction is again an inner (more central) part of the bandwidth. Second and third portions of the bandwidth, adjacent the inner portion and on opposite sides of the inner portion, are assigned as guard bands (preferably of equal size). A fourth portion adjacent the second portion guard band and a fifth portion adjacent the third portion guard band are assigned for the forward direction. These fourth and fifth portions of the bandwidth may be outer portions of the bandwidth. A third configuration also assigns an inner (more central) part of the transmission symbol bandwidth to the reverse direction. Again, second and third portions of the bandwidth, adjacent the inner portion and on opposite sides of the inner portion, are assigned as guard bands. A fourth portion, adjacent the second portion guard band, is assigned for the forward direction. The fourth portion and the third portion may be the outer portions of the bandwidth. In this case, the second portion guard band is typically wider than the third portion guard band. Other configurations can be conceived, based on these, however.

Time frame (or sub-frame) structure may also include an indication of whether this type of time frame configuration is being used and/or which specific time frame configuration is being employed, for example as part of a Downlink Control Information (DCI) transmission.

The structure may be implemented in software, hardware, firmware, programmable logic, some other type of programmable or configurable hardware or a combination of these technologies, for example. A TDD two-way communication device configured to communicate in accordance with the radio frame structure can also be considered.

BRIEF DESCRIPTION OF THE DRAWINGS

The invention may be put into practice in various ways, one of which will now be described by way of example only and with reference to the accompanying drawing in which.

DETAILED DESCRIPTION OF PREFERRED EMBODIMENTS

In TDD, each transmission radio or time sub-frame is configured for communication in one direction, which in the case of communication between a base station (or access point) and a user terminal (or mobile station or user equipment), can be uplink or downlink. For the sake of simplicity, all of the examples disclosed herein will describe a TDD radio sub-frame configured for downlink operation, but it will be immediately recognised that the uplink and downlink assignments or allocations can be swapped for a radio sub-frame configured for uplink and the same procedure would apply.

Figure 1:
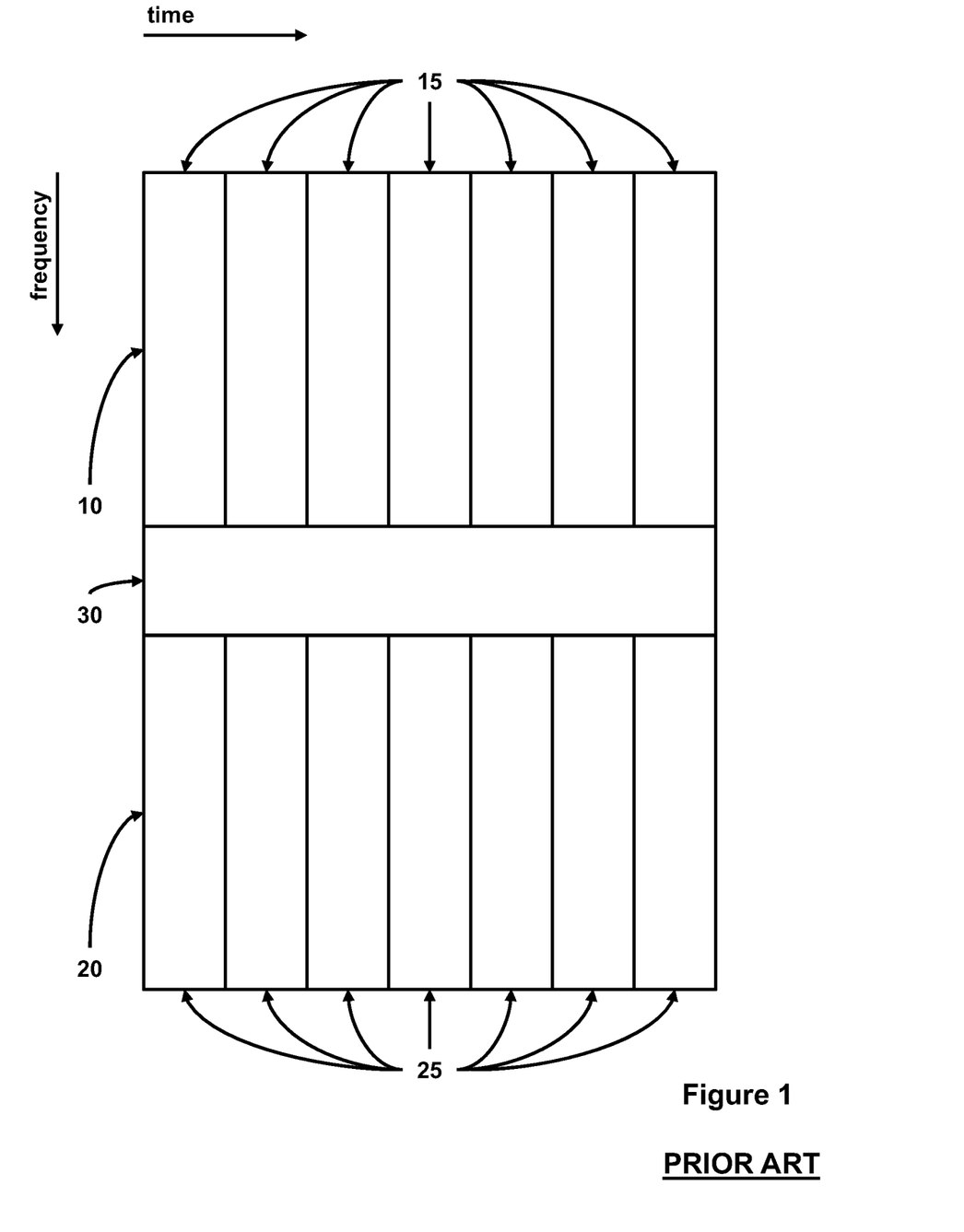
FIG. 1 shows an example schematic illustration of an existing TDD sub-frame structure for two operators operating in adjacent frequency allocations.

The invention deals with the allocation of transmission symbols within a sub-frame (although the term "sub-frame" could equally be considered a "frame" for an alternative time frame structure). Therefore, it is useful to identify an existing frame (sub-frame) structure for comparison purposes. Referring to FIG. 1, there is shown an example schematic illustration of an existing TDD sub-frame structure for two operators (carriers) operating in adjacent frequency allocations. The first radio sub-frame 10, for the first operator, is separated from the second radio sub-frame 20 for the second operator by a guard band 30. The first radio sub-frame 10 is split into seven first transmission symbols 15 and the second radio frame 20 is split into seven second transmission symbols 25. All of the first transmission symbols 15 are configured for transmission in the same direction (uplink or downlink). All of the second transmission symbols 25 are also configured for transmission in the same direction as that of the first transmission symbols 15.

A transmission symbol may be understood as a waveform, a state or a significant condition of the communication channel that persists for a fixed period of time. It will be appreciated that a single transmission symbol may comprise a large number of bits, especially if an Orthogonal Frequency Division Multiplexing (OFDM) system is employed having multiple sub-carriers, each of which may communicate multiple bits as part of the transmission symbol at any one time. The duration of a transmission symbol is therefore significantly less than that of a frame or sub-frame.

Figure 2:
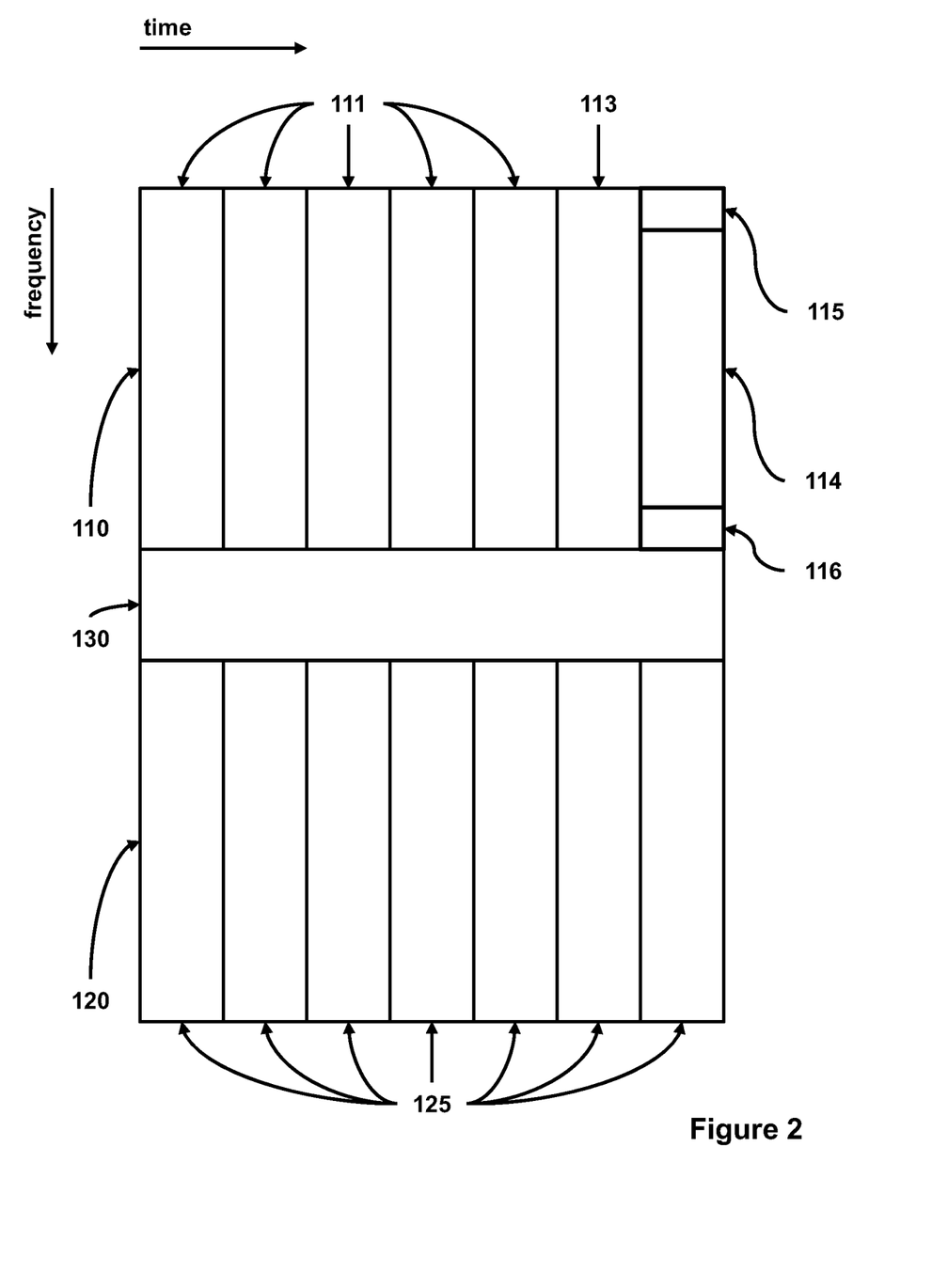
FIG. 2 depicts a schematic illustration of a TDD sub-frame structure for two operators operating in adjacent frequency allocations in accordance with a first embodiment.

Referring to FIG. 2, there is depicted a schematic illustration of a TDD sub-frame structure for two operators operating in adjacent frequency allocations in accordance with a first embodiment. As with the existing structure of FIG. 1, in this embodiment, the first radio sub-frame 110, for the first operator, is separated from the second radio sub-frame 120 for the second operator by a guard band 130. The first radio sub-frame 110 is split into seven first transmission symbols and the second radio frame 120 is split into seven second transmission symbols 125. The initial five first transmission symbols 111 are all configured for downlink transmission, with the whole bandwidth assigned to the radio frame being used for this purpose. The sixth first transmission symbol 113 is a guard interval. The frequency bandwidth of the seventh (final) first transmission symbol is divided into three portions: the middle portion of the bandwidth 114 is used for uplink transmissions; outer portions 115, 116 of the bandwidth are used as guard bands. All of the second sub-frames 125 for the second operator are configured for downlink transmission.

In this way, a transmission symbol 114, 115, 116 is allocated exclusively for uplink transmission, but only within a part of its transmission bandwidth. Such approaches allow fast feedback in a TDD system. The guard interval may help to permit the change in direction of communication, so that the communications devices can switch between transmission and reception. Effectively, the guard band 130 is extended in the final transmission symbol by guard band 116, to avoid any interference to (and from) other operator's users, receiving signals on an adjacent band. It should be noted that, a third operator using frequencies on the other side of the first operator's transmissions from the second operator could be present, although this is not shown. In that case, the guard band 130 is also effectively extended in the final transmission symbol by guard band 115 as well. In an OFDM based system, the use of only a portion of the frequency bandwidth may be achieved by allocating only a subset of the resource blocks (RBs) in the middle of operator's spectrum allocation, as indicated by uplink assignment 114.

In general terms, this may be considered as a method of structuring a transmission time frame for Time Division Duplex (TDD) two-way communication over a frequency bandwidth. The transmission time frame is assigned for a first direction of communication and is temporally divided into a plurality of transmission symbols. A fraction (and preferably only a fraction) of the frequency bandwidth for a selected transmission symbol from the plurality of transmission symbols is assigned to a second direction of communication. The second direction is opposite to the first direction. For example, if the first direction is a downlink, the second direction is an uplink or if the first direction is an uplink, the second direction is a downlink. Typically, the communication is between a mobile terminal or user equipment and an access point or base station. It may be for a cellular network, wireless wide area network (WAN) or wireless local area network (LAN). Whilst two-way communication is a minimal requirement, embodiments in which one of the communication devices (such as a base station or access point) is configured to communicate with multiple other devices (user terminals) and in this sense, the terms uplink and downlink apply with respect to the base station or access point and multiple user terminals (or mobile stations) as appropriate. Embodiments described herein may also be applicable to systems in which the two-way communication need not be between an access point or base station and a user terminal.

Preferably, this method may further comprise communicating (transmitting and/or receiving) in accordance with the assigned transmission time frame structure. A Time Division Duplex (TDD) two-way communication device configured to communicate in accordance with any method as herein disclosed is also provided. Structural features to implement this method, such as one or more of a: transmitter; receiver; transceiver; controller; modulator; processor; and antenna, may be provided, configured to implement transmission and/or reception in accordance with the time frame structure herein disclosed.

Advantageously, the majority (preferably all but one) of the remaining transmission symbols from the plurality of transmission symbols are assigned to the first direction of communication. Optionally, more than one transmission symbol may be selected and used for this type of assignment, although at least the majority of the transmission symbols of the frame are typically assigned to the first direction of transmission. In preferred embodiments, the fraction of the frequency bandwidth for the selected transmission symbol assigned to the second direction of communication is used for communicating data acknowledgement information (such as ARQ or ACK/NACK messages). Advantageously, the TDD two-way communication over the frequency bandwidth uses Orthogonal Frequency Division Multiplexing (OFDM) although other transmission techniques could be employed to restrict the bandwidth for one or more transmission symbols, whilst allowing other transmission symbols to have a wider bandwidth.

In preferred embodiments, the fraction of the frequency bandwidth assigned to the second direction of communication is a first fraction in an inner (or central) portion of the frequency bandwidth. Then, the assignment may further comprise: assigning a second fraction of the frequency bandwidth for the selected transmission symbol, adjacent to the first fraction, as a guard band. Beneficially, the assignment may additionally comprise: assigning a third fraction of the frequency bandwidth for the selected transmission symbol, adjacent to the first fraction and on an opposite sides of the first fraction to the second fraction, as a guard band. In this way, the second and third fractions of the bandwidth are guard bands on opposite sides of the first fraction. The second and third fractions may be outer portions of the frequency bandwidth and/or the sum of the first, second and third fractions may be the whole of the frequency bandwidth for the selected transmission symbol. It may be recognised that the bandwidth of the second fraction and the bandwidth of the third fraction may be the same or different (for example, the second fraction being wider or the third fraction being wider).

Preferably, the transmission time frame is temporally divided into: a first plurality of transmission symbols assigned for the first direction of communication; the selected transmission symbol (or selected transmission symbols if there are multiple such transmission symbols), a fraction of its (or their) frequency bandwidth being assigned to the second direction of communication; and at least one guard interval transmission symbol between the first plurality of transmission symbols and the selected transmission symbol (or transmission symbols). The guard interval may allow changes in direction of communication from the forward to reverse direction, giving time for switching between transmission and reception and avoid interference between transmission and reception.

The TDD two-way communication may be for a first communication link and the frequency bandwidth is then a first frequency bandwidth. In embodiments, a second communication link is provided by a second frequency bandwidth, separated from the first frequency bandwidth by a guard band. The first communication link may be for a first operator and the second communication link may be for a second (different) operator. The second communication link is beneficially also a TDD two-way communication link. The bandwidth of the first frequency bandwidth and the bandwidth of the second frequency bandwidth may be the same. A transmission time frame for the second communication link, when it is for TDD two-way communication may also be temporally divided into a plurality of transmission symbols, preferably with the same division as for the transmission time frame for the first communication link. In this case, all of the plurality of transmission symbols of the transmission time frame for the second communication link may be assigned for the same direction of communication as the transmission time frame for the first communication link.

Additional generalised details will be disclosed further below. Further examples of the disclosure's implementation will first be described, however.

In a second example of the implementation, one of the transmission symbols is again used for uplink transmissions (for a time sub-frame assigned for downlink). Some of the bandwidth (RBs) for this transmission symbol, especially in the middle of the bandwidth, is assigned for uplink transmission and another fraction of the transmission symbol's bandwidth (RBs) is allocated to DL. This may be especially useful for large bandwidth transmissions.

Figure 3:
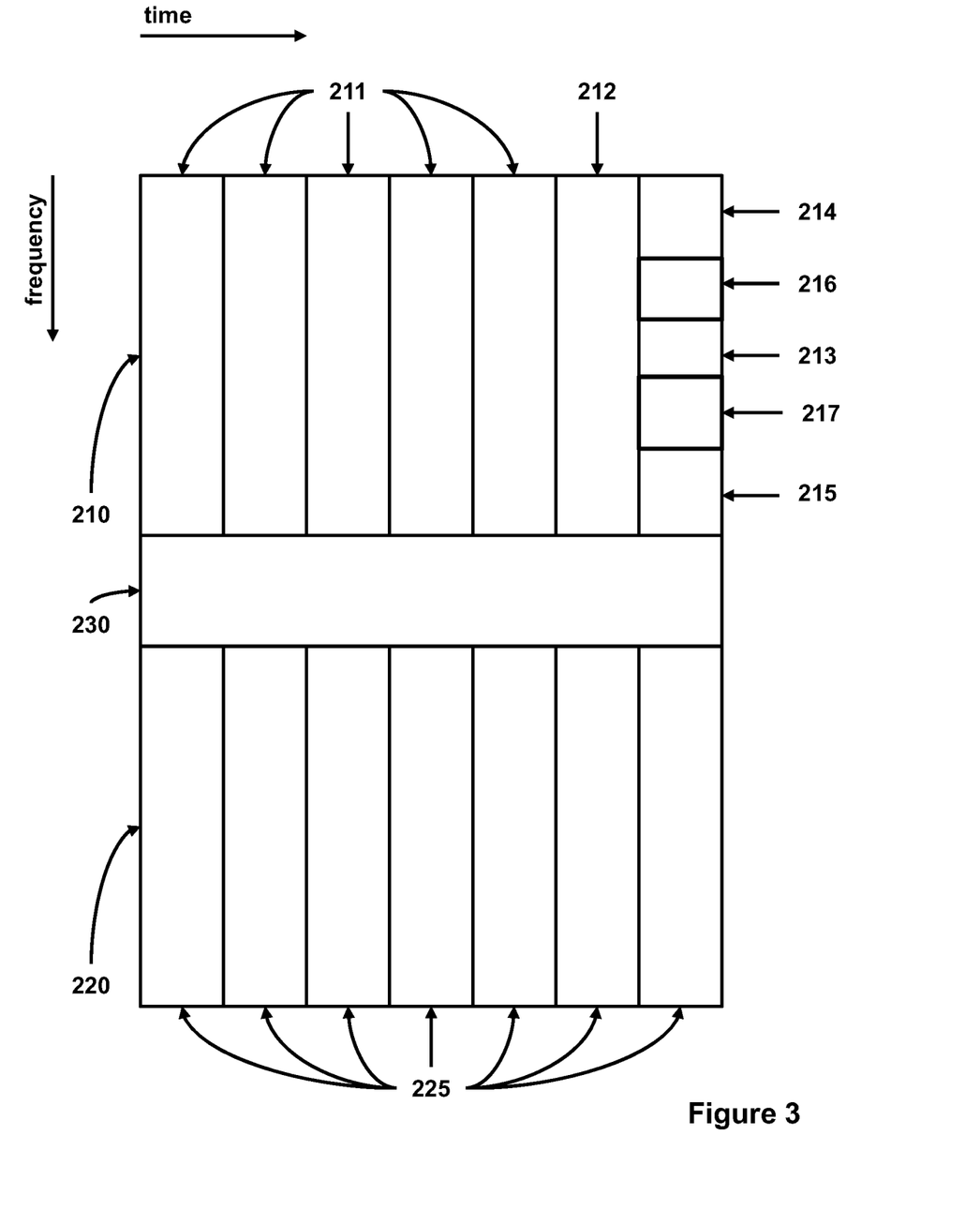
FIG. 3 depicts a schematic illustration of a TDD sub-frame structure for two operators operating in adjacent frequency allocations in accordance with a second embodiment.

With reference to FIG. 3, there is depicted a schematic illustration of a TDD sub-frame structure for two operators operating in adjacent frequency allocations in accordance with a second embodiment. Once more, the first radio sub-frame 210, for the first operator, is separated from the second radio sub-frame 220 for the second operator by a guard band 230. The first radio frame 210 is split into seven first transmission symbols and the second radio frame 220 is split into seven second transmission symbols 225. As with FIG. 2, the initial five first transmission symbols 211 are all configured for downlink transmission, with the whole bandwidth assigned to the radio frame being used for this purpose. The sixth first transmission symbol 212 is a guard interval. The frequency bandwidth of the seventh (final) first transmission symbol is now divided into five portions: the middle portion of the bandwidth 213 is used for uplink transmissions; either side of the middle portion 213 are provided guard band portions 216, 217; and outer portions of the bandwidth 214, 215 are used for downlink transmissions. All of the second transmission symbols 225 for the second operator are configured for downlink transmission.

Figure 4:
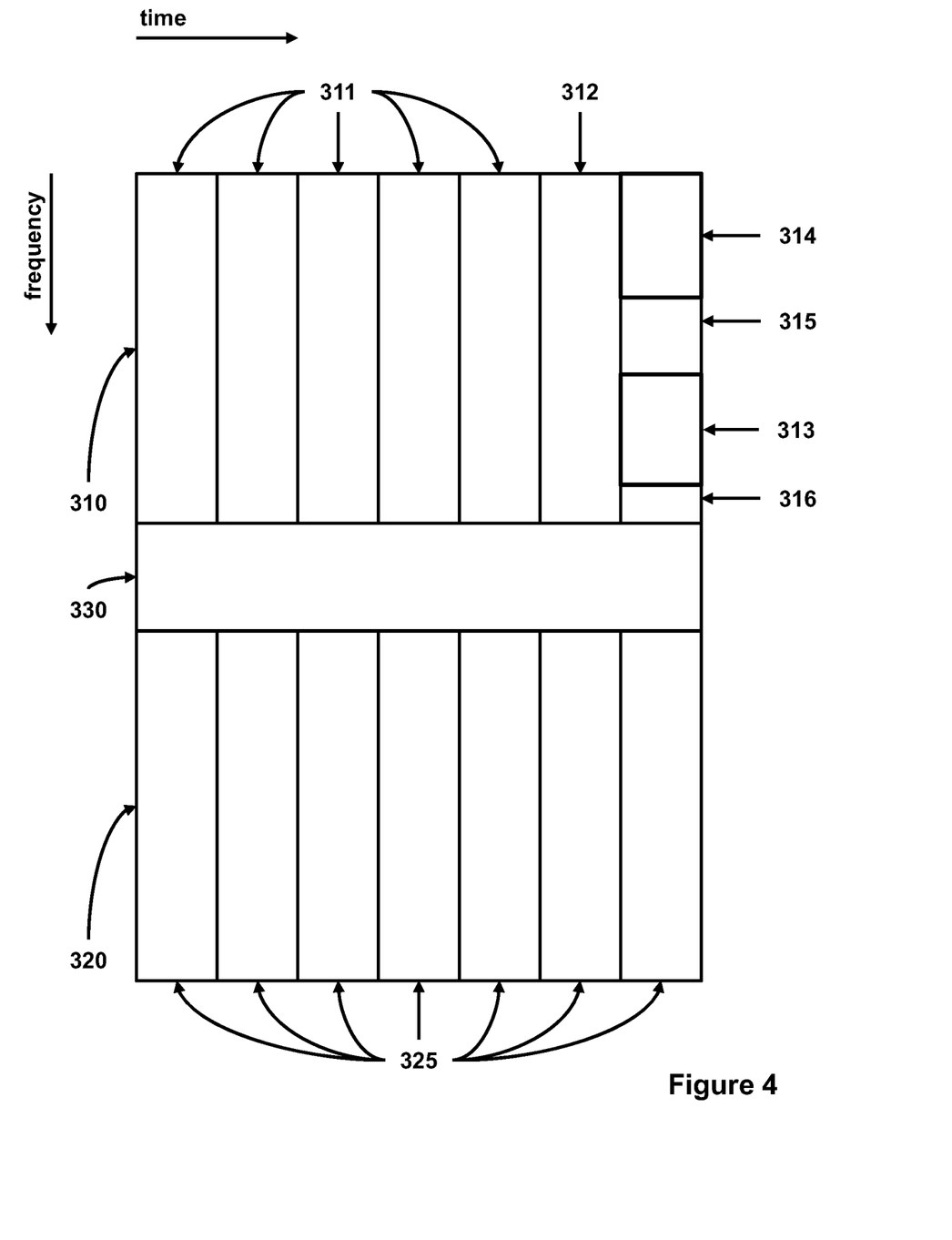
FIG. 4 depicts a schematic illustration of a TDD sub-frame structure for two operators operating in adjacent frequency allocations in accordance with a third embodiment.

Referring next to FIG. 4, there is depicted a schematic illustration of a TDD sub-frame structure for two operators operating in adjacent frequency allocations in accordance with a third embodiment. This is similar to the second embodiment of FIG. 3, but with some small differences. The first radio sub-frame 310, for the first operator, is separated from the second radio sub-frame 320 for the second operator by a guard band 330. The first radio sub-frame 310 is split into seven first transmission symbols and the second radio frame 320 is split into seven second transmission symbols 325. As with FIGS. 2 and 3, the initial five first transmission symbols 311 are all configured for downlink transmission, with the whole bandwidth assigned to the radio sub-frame being used for this purpose. The sixth first transmission symbol 312 is a guard interval.

The frequency bandwidth of the seventh (final) first transmission symbol is divided into four portions: a middle portion of the bandwidth 313 is used for uplink transmissions; either side of the middle portion 313 are provided guard band portions 315, 316; and an outer portion of the bandwidth 314, which is next to one of the guard bands 315 is used for downlink transmissions. The guard band 315 between the uplink assigned portion 313 and the downlink assigned portion 314 is wider than the other guard band 316. This is because guard band 316 extends the existing guard band 330, whereas guard band 315 provides the only separation between the uplink assigned portion 313 and the downlink assigned portion 314. All of the second transmission symbols 325 for the second operator are configured for downlink transmission. It should be noted that the order of the frequency bandwidth portions shown in FIG. 4 may be reversed. In other words, the middle portion of the bandwidth 313 would still be used for uplink transmissions, but the positioning of the guard portion 316 and the combination of the downlink portion 314 and guard portion 315 relative to the uplink portion 313 would be swapped.

The approaches of FIGS. 3 and 4 therefore desirably used two additional guard bands 216, 217 or 315, 316. These guard bands are added for the same reason as the first embodiment of FIG. 2, to avoid interference. Thus, in a frame with 7 symbols, 5 symbols are used for downlink employing the full frequency bandwidth and one transmission symbol is used for uplink using a subset of RBs (allocated to a first user equipment) in the middle of the band or at the edge. Other available RBs (bandwidth portions) are assigned or dedicated to downlink (and may be allocated to different user terminals). These approaches might lead to more complex base station RF design, as it may desirably transmit and receive simultaneously, for example using different transmission and reception chains at the base station in the same way as an FDD architecture. In this case, the duplex distance is defined as the guard band. Other approaches combining downlink and uplink transmission in the same transmission symbol can be conceived, based on those illustrated by FIGS. 3 and 4, for example.

All such approaches also allow benefit from fast feedback, whilst allocating unused frequency resources to downlink for more efficient spectral usage. This is achieved by transmitting in both directions of the two-way communication within the same transmission symbol of the frame structure.

These embodiments may also be described in the general terms detailed above. Then in some embodiments, the assignment may further comprise: assigning a fourth fraction of the frequency bandwidth for the selected transmission symbol adjacent to the second fraction, to the first direction of communication. Optionally and especially in this case, the bandwidth of the second fraction (guard band) is larger than the bandwidth of the third fraction (guard band). In some such embodiments, the sum of the first, second, third and fourth fractions is the whole of the frequency bandwidth for the selected transmission symbol and/or the third fraction and the fourth fraction may be outer portions of the frequency bandwidth. In other such embodiments, the assignment may additionally further comprise: assigning a fifth fraction of the frequency bandwidth for the selected transmission symbol adjacent to the third fraction (guard band), to the first direction of communication. Optionally, the bandwidth of the second fraction and the bandwidth of the third fraction are the same. The sum of the first, second, third, fourth and fifth fractions is the whole of the frequency bandwidth for the selected transmission symbol and/or the fourth fraction and the fifth fraction may be outer portions of the frequency bandwidth.

Other fractions of the bandwidth may be used as guard bands, for assignment to the first direction of communication or for assignment to the second direction of communication, as appropriate. In any case, the sum of all of such fractions is preferably the whole of the frequency bandwidth for the selected transmission symbol. In other words, fractions of the bandwidth are not allocated for other purposes in accordance with such embodiments.

Additional examples of the disclosure's implementation will now be described, in particular with reference to how the frame structure is communicated over the communication link. For example, an indication of the use of a transmission symbol with an allocation to the reverse direction could be provided on a downlink using a layer 1 (physical) downlink control channel (PDCCH), which is located in the first 2 to 3 symbols of each sub-frame. The PDCCH is a physical channel that carries Downlink Control Information (DCI). Different DCIs carry different control information such as Transport format and resource allocation. A new DCI format or a modification to DCI 0 (which is for uplink scheduling assignment) could include this indication. The message can be the configuration number related to each sub-frame structure, which would be known at both transmitter and receiver. For example, the existing frame structure (of FIG. 1) could be indicated by '0' and the frame structures of FIGS. 2, 3 and 4 might be indicated by '1', '2', and '3' respectively in DCI format.

In the general terms discussed above, it may be considered that the TDD two-way communication over the frequency bandwidth extends over a plurality of transmission time frames (or sub-frames). Then, the assignment may be performed for at least one of the plurality of transmission time frames (and optionally more than one). Then, for each of the plurality of transmission time frames, an indication as to whether the assignment is being performed for the respective transmission time frame may be communicated (transmitted or received, as appropriate). In this way (potentially with a single bit of information), the change in radio frame structure may be indicated. Optionally, this communication may further indicate the (exact) frame (or sub-frame) structure. For example, this communication may be in the form of a code in which specific frame structure has an associated indication. This may allow the indication to be made efficiently.

Other details of the specific examples described herein will now be presented. One point to consider is the width of the guard band used for separating the fraction of the transmission bandwidth assigned to uplink from the guard band used for separating different operators' transmissions. The UK communications regulator (Ofcom) have proposed a mask for out of block baseline power in an Information Memorandum on "The award of 2.3 and 3.4 GHz spectrum bands"(https://www.ofcom.org.uk/_data/assets/pdf_file/0030/81579/info-memorandum.pdf). This refers to the Effective Isotropic Radiated Power (EIRP) emanating from Radio Equipment transmissions at any frequency outside permitted frequency blocks and indicates that it should not exceed the following baseline:

Out of block baseline power limit (BS)=−36 dBm/5 MHz EIRP.

The examples described above can therefore be combined in an effective way for downlink operation (although uplink operation can equivalently be understood), using the following approach.

i. Based on the service requirements of the user (low latency requirements) and the amount of uplink resources needed considering the bandwidth, the base station decides which TDD sub-frame structure to use (based on those of FIGS. 1, 2, 3 and 4). These represent five configurations for the last symbol in each downlink sub-frame:
  1. downlink (DL);
  2. Guard band of first width (GB1)+uplink (UL)+GB1;
  3. DL+Guard band of second width (GB2)+UL+GB1;
  4. GB1+UL+GB2+DL; and
  5. DL+GB2+UL+GB2+DL.

ii. Each user equipment is provided with an indication of the chosen sub-frame structure in the layer 1 downlink control channel at the beginning of each sub-frame. For example, if the base station wishes to allocate sub-frame structure 2 to a user equipment, it will send a message indicating '2' in a new DCI format or it is included in the messages send in DCI 0.

iii. The user equipment will use the given resources to transmit fast ACK/NACK

It should be noted that the width of GB1 can be decided based on Ofcom's restrictive mask, as indicated above. The width of GB2 can be the same as guard band in FDD mode.

Although specific embodiments have now been described, the skilled person will understand that various modifications and variations are possible. For example, the frame or sub-frame structure can be varied, along the lines suggested herein. Moreover, the frame structure may be used for a range of different communication systems, which need not be cellular-based or wireless LAN-based. Also, combinations of any specific features shown with reference to one embodiment or with reference to multiple embodiments are also provided, even if that combination has not been explicitly detailed herein.

The invention claimed is:

1. A Time Division Duplex (TDD) two-way communication device configured to structure a transmission time frame for TDD two-way communication on frequency bands that are extendable below 6 GHz, the transmission time frame being assigned for a direction of communication and being temporally divided into a plurality of transmission symbols, wherein a separating guard band separates the transmission time frame from a second transmission time frame, said device comprising a processor configured to:
  assign a first fraction of a frequency bandwidth for a selected transmission symbol from the plurality of transmission symbols to an opposite direction of communication, wherein the first fraction is an inner portion of the frequency bandwidth for the selected transmission symbol, wherein the first fraction includes data acknowledgement information, and wherein a frequency band for the transmission time frame, which includes the selected transmission symbol, is extendable below 6 GHz;
  assign a second fraction within the frequency bandwidth for the selected transmission symbol as a first guard band;
  assign a third fraction within the frequency bandwidth for the selected transmission symbol as a second guard band, wherein the first guard band and the second guard band are positioned on opposite sides of the first fraction in the selected transmission symbol;
  cause the second guard band to be at a first position that is adjacent to the separating guard band, which is not a part of the selected transmission symbol, and cause the first guard band to be at second position that is adjacent to a different guard band, which is also not a part of the selected transmission symbol, resulting in a first set of two guard bands being located next to one another at a first end of the selected transmission symbol and a second set of two guard bands being located next to one another at a second end of the selected transmission symbol; and
  as a result of the second guard band being adjacent to the separating guard band, resulting in a combination of the second guard band and the separating guard band providing separation between communications, and as a result of the first guard band independently providing separation between communications transmitted in opposing directions, configuring a bandwidth of the first guard band to be larger than a bandwidth of the second guard band.

2. The TDD two-way communication device of claim 1, wherein the first fraction of the frequency bandwidth assigned to the opposite direction of communication is in an inner portion of the frequency bandwidth, wherein the second and the third fractions of the frequency bandwidth for the selected transmission symbol are adjacent to the first fraction and on opposite sides of the first fraction, as guard bands.

3. The TDD two-way communication device of claim 2, wherein the step of assigning further comprises:
  assigning a fourth fraction of the frequency bandwidth for the selected transmission symbol adjacent to the second fraction, to the direction of communication.

4. The TDD two-way communication device of claim 3, wherein the bandwidth of the second fraction is larger than the bandwidth of the third fraction.

5. The TDD two-way communication device of claim 3, wherein the step of assigning further comprises:
assigning a fifth fraction of the frequency bandwidth for the selected transmission symbol adjacent to the third fraction to the direction of communication.

6. The TDD two-way communication device of claim 2, wherein the bandwidth of the second fraction and the bandwidth of the third fraction are the same.

7. The TDD two-way communication device of claim 2, wherein a sum of all of the fractions is a whole of the frequency bandwidth for the selected sub-frame.

8. The TDD two-way communication device of claim 1, wherein the transmission time frame is temporally divided into:
a first plurality of transmission symbols assigned for the direction of communication;
the selected transmission symbol, a fraction of its frequency bandwidth being assigned to the opposite direction of communication; and
at least one guard interval transmission symbol between the first plurality of transmission symbols and the selected transmission symbol.

9. The TDD two-way communication device of claim 1, wherein the TDD two-way communication over the frequency bandwidth extends over a plurality of transmission time frames, the step of assigning being performed for at least one of plurality of transmission time frames, and wherein the processor is further configured to:
communicate, for each of the plurality of transmission time frames, an indication as to whether the step of assigning is being performed for at least one transmission symbol of the respective transmission time frame.

10. The TDD two-way communication device of claim 9, wherein the step of communicating further indicates the frame structure.

11. The TDD two-way communication device of claim 1, wherein the TDD two-way communication is for a first communication link and the frequency bandwidth is a first frequency bandwidth, a second communication link being provided by a second frequency bandwidth separated from the first frequency bandwidth by a guard band.

12. The TDD two-way communication device of claim 1, wherein the TDD two-way communication over the frequency bandwidth uses Orthogonal Frequency Division Multiplexing, OFDM.

13. The TDD two-way communication device of claim 1, wherein the processor is further configured to:
communicate in accordance with the assigned transmission time frame structure.

14. A Time Division Duplex (TDD) two-way communication device configured to structure a transmission time frame for TDD two-way communication on frequency bands that are extendable below 6 GHz, the transmission time frame being assigned for a direction of communication and being temporally divided into a plurality of transmission symbols, wherein a separating guard band separates the transmission time frame from a second transmission time frame, said device comprising a processor configured to:
assign a first fraction of a frequency bandwidth for a selected transmission symbol from the plurality of transmission symbols to an opposite direction of communication, wherein the first fraction is an inner portion of the frequency bandwidth for the selected transmission symbol, wherein the first fraction includes data acknowledgement information, and wherein a frequency band for the transmission time frame, which includes the selected transmission symbol, is extendable below 6 GHz;
assign a second fraction within the frequency bandwidth for the selected transmission symbol as a first guard band;
assign a third fraction within the frequency bandwidth for the selected transmission symbol as a second guard band, wherein the first guard band and the second guard band are positioned on opposite sides of the first fraction in the selected transmission symbol;
cause the second guard band to be at a position that is adjacent to the separating guard band, resulting in two separate guard bands being positioned immediately next to one another; and
as a result of the second guard band being adjacent to the separating guard band, resulting in a combination of the second guard band and the separating guard band providing separation between communications, and as a result of the first guard band independently providing separation between communications transmitted in opposing directions, configuring a bandwidth of the first guard band to be larger than a bandwidth of the second guard band, wherein:
the selected transmission symbol is configured to include one or more internally positioned guard bands and one or more externally positioned guard bands,
the one or more externally positioned guard bands being located on a first terminal end or a second terminal end of the selected transmission symbol,
the one or more internally positioned guard bands being bounded on either side by another guard band that is included in the selected transmission symbol or a message that is included in the selected transmission symbol, and
in response to one of the one or more externally positioned guard bands having a position that is next to another guard band that is not a part of the selected transmission symbol, the one or more externally positioned guard bands are configured to be smaller than the one or more internally positioned guard bands.

* * * * *